United States Patent
Mir et al.

(10) Patent No.: US 7,123,590 B2
(45) Date of Patent: Oct. 17, 2006

(54) METHOD AND APPARATUS FOR TESTING A WIRELESS LINK USING CONFIGURABLE CHANNELS AND RATES

(75) Inventors: Idreas A. Mir, San Diego, CA (US); R. Nicholson Gibson, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 434 days.

(21) Appl. No.: 10/392,130

(22) Filed: Mar. 18, 2003

(65) Prior Publication Data
US 2004/0185785 A1    Sep. 23, 2004

(51) Int. Cl.
*H04J 1/16*    (2006.01)
*H04J 3/24*    (2006.01)
(52) U.S. Cl. .................... 370/252; 370/474
(58) Field of Classification Search ............... 370/252, 370/320, 319, 335, 431, 441, 468, 342, 241
See application file for complete search history.

(56) References Cited

U.S. PATENT DOCUMENTS 5,802,105 A * 9/1998 Tiedemann et al. ......... 375/225
6,542,538 B1 * 4/2003 Fischel et al. ............. 375/224
2003/0036403 A1 * 2/2003 Shiu et al. .................. 455/522

FOREIGN PATENT DOCUMENTS

WO    0152568    7/2001

* cited by examiner

*Primary Examiner*—Andrew C. Lee
(74) *Attorney, Agent, or Firm*—Philip R. Wadsworth; Thien T. Nguyen; Sayed Hossain Beladi

(57) ABSTRACT

Techniques to test a wireless communication link using configurable channels and rates. A W-Markov test service may be invoked to test and/or verify the performance of the downlink and/or uplink using at least one transport channel for each link. Each transport channel may be individually configured. The W-Markov test service supports generation of test data based on a defined data sequence or a pseudo-random number generator. The testing may be performed based on a particular deterministic or pseudo-random activity model. For voice call testing, a first-order Markov model may be used to model voice activity and to select the rate to use for each transmission time interval (TTI). For Adaptive Multi-Rate (AMR), testing may be performed based on configurable AMR rates and silence descriptor (SID) types. The test data generation processes are synchronized between the transmitter and receiver. Bit, frame, and/or block error rates and other statistics may be collected.

24 Claims, 9 Drawing Sheets

METHOD AND APPARATUS FOR TESTING A WIRELESS LINK USING CONFIGURABLE CHANNELS AND RATES

BACKGROUND

I. Field

The present invention relates generally to data communication, and more specifically to techniques for testing a wireless link using configurable channels and rates.

II. Background

Wireless communication systems such as code division multiple access (CDMA) systems, time division multiple access (TDMA) systems, and others are widely deployed to provide various types of services such as voice, packet data, and so on. For these systems, it is highly desirable to utilize the available resources as efficiently as possible. This typically entails transmitting as much data to as many users within as short a time period as supported by the conditions of the wireless links.

To achieve the above goal, the wireless links between the base stations and terminals within the system may be characterized. Based on the characterized link conditions, the system may be better able to (1) select a particular set of terminals to serve, (2) allocate a portion of the available resources (e.g., transmit power) to each selected terminal, and (3) transmit to each selected terminal at a data rate deemed to be supported by the allocated transmit power and characterized link conditions.

Conventionally, a wireless link is characterized by transmitting a known data pattern (e.g., generated by a pseudo-random number generator), receiving the transmitted data pattern, comparing the received data pattern with a locally generated data pattern to determine transmission errors, and reporting the results back to the transmitter. This "loop-back" testing is typically performed continuously for a number of frames over a desired test interval. The test results would then be reflective of the performance of the wireless link over that test interval.

Many newer generation wireless communication systems are capable of flexible operation. For example, voice data may be transmitted in a non-continuous manner (depending on the amount of speech activity) and over one or multiple (e.g., transport) channels, the rate may be allowed to vary from frame to frame, the processing of the data may also vary (e.g., from frame to frame and/or from channel to channel), and so on. The conventional loop-back test technique typically characterizes the wireless link for one channel based on a set of test parameters. This conventional test technique may not provide an accurate assessment of the performance of the wireless link when the system operates in this flexible manner.

There is therefore a need in the art for techniques that can characterize a wireless link under various flexible operating conditions supported by a wireless communication system.

SUMMARY

Techniques are provided herein to test a wireless link using configurable channels and rates. In an aspect, a W-Markov test service is provided which may be invoked to test and/or verify the performance of the downlink and/or uplink "transport" channels. One or multiple transport channels may be used to test each link. Each transport channel may be configured with its own set of parameters, which may specify the coding, rate matching, transmission time interval (TTI), and so on, to use for the transport channel. This allows for independent testing of the transport channels and further allows for independent testing of the downlink and uplink.

In an embodiment, the W-Markov test service supports the generation of test data based on a defined data sequence (e.g., a selectable byte pattern) or a pseudo-random number generator. The testing may be performed based on a particular (defined or pseudo-random) activity model. For voice call testing, a first-order Markov model may be used to model voice activity and to select the rate to use for each TTI. For Adaptive Multi-Rate (AMR), testing may be performed based on configurable AMR rates and silence descriptor (SID) types (which are described below).

The test data generation processes are synchronized between the transmitter and receiver. This permits the receiver to reproduce the transmitted test data and compare the locally generated test data against the received test data. A W-Markov test entity at the receiver counts the number of data blocks transmitted on the transport channels and the results of the comparison between the received and locally generated data blocks. Bit error, frame error, block error, and other statistics may be derived from these counts.

Various aspects and embodiments of the invention are described in further detail below. The invention further provides methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
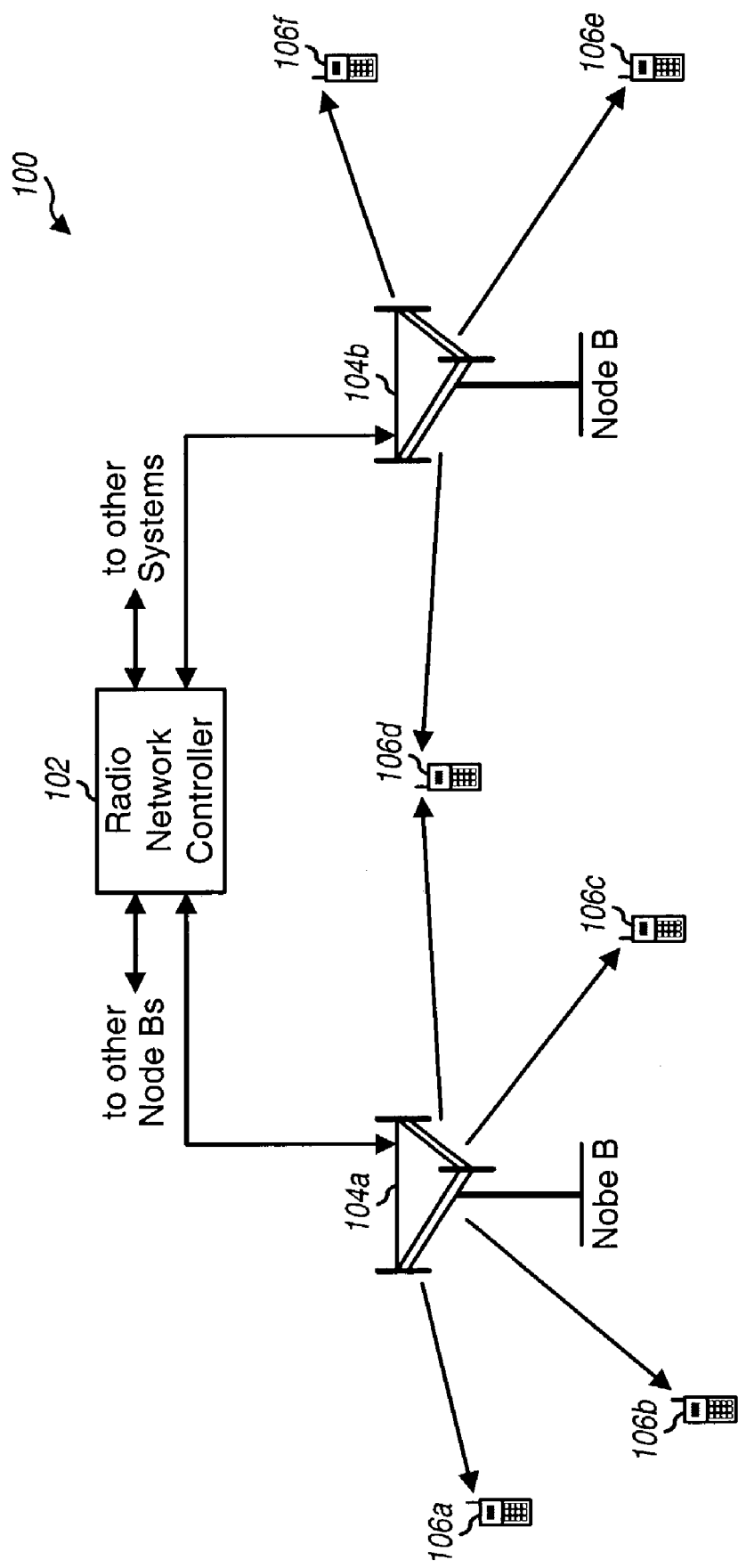
FIG. 1 shows a spread spectrum communication system that supports a number of users.

FIG. 1 shows a spread spectrum communication system 100 that supports a number of users. System 100 includes a number of base stations 104 that communicate with a number of terminals 106. The base stations are fixed stations used for communicating with the terminals and may be part of a UMTS Radio Access Network (UTRAN). A base station may also be referred to as a node B, a base transceiver system (BTS), an access point, or some other terminology.

Various terminals 106 may be dispersed throughout the system. A terminal may also be referred to as a user equipment (UE), a mobile station, a remote station, an access terminal, or some other terminology. Each terminal 106 may communicate with one or multiple base stations 104 on the downlink (forward link) and/or uplink (reverse link) at any given moment. This depends on whether or not the terminal is active, whether or not soft handover is supported, and whether or not the terminal is in soft handover. The downlink refers to the communication link from a base station to a terminal, and the uplink refers to the communication link from the terminal to the base station. In the example shown in FIG. 1, base station 104a communicates with terminals 106a through 106d, and base station 104b communicates with terminals 106d through 106f. Terminal 106d is located in an overlapping coverage area and communicates with, or receives transmission from, base stations 104a and 104b.

A radio network controller (RNC) 102 couples to base stations 104 and may further couple to other systems such as a public switched telephone network (PSTN), a packet data node (PDN), and so on. RNC 102 provides coordination and control for the base stations coupled to it. Via the base stations, RNC 102 controls the routing of calls (1) among the terminals and (2) between the terminals and other users coupled to the PSTN (e.g., conventional telephones) and PDN. RNC 102 may also be referred to as a base station controller (BSC), a mobile switching center (MSC), a system controller, or some other terminology.

System 100 may be designed to support one or more CDMA standards such as W-CDMA, IS-95, IS-2000, IS-856, and so on. These CDMA standards are well known in the art. Each standard uses different terminology and supports different channel structure and signal processing. For clarity, the following description is for a W-CDMA system. Using W-CDMA terminology, the base station and terminal are referred to as node B and UE, respectively.

Figure 2A:
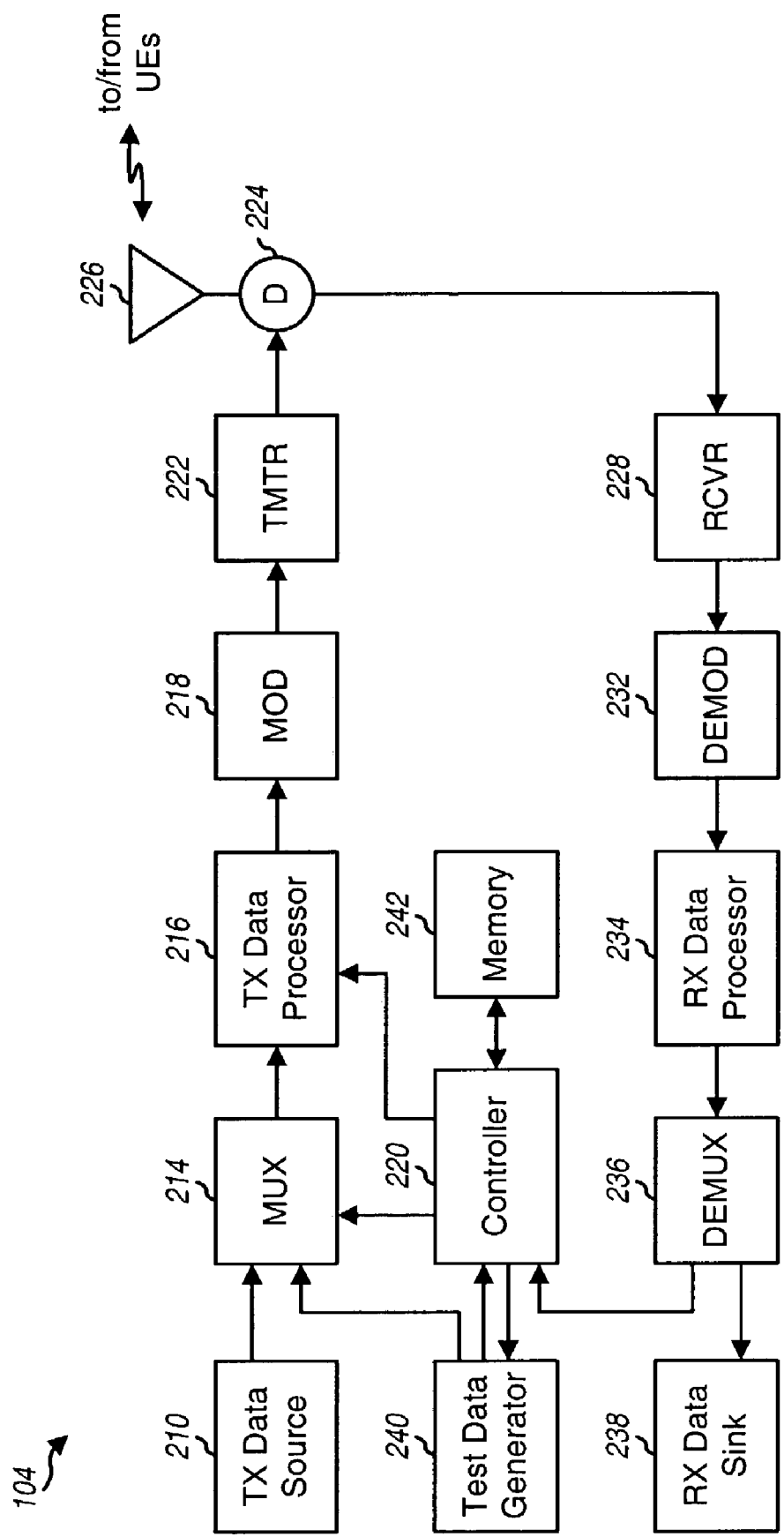
FIGS. 2A and 2B are block diagrams of a node B and a UE, respectively, in the system.

FIG. 2A is a block diagram of an embodiment of node B 104. On the downlink, voice and packet data (collectively referred to herein as "traffic" data) from a transmit (TX) data source 210 and test data from a test data generator 240 are provided (typically in blocks) to a multiplexer (MUX) 214. Multiplexer 214 provides the traffic data to a TX data processor 216 when operating in a normal mode, and provides the test data when operating in a test mode. TX data processor 216 processes (e.g., formats, encodes, and interleaves) the received data, which is further processed (e.g., spread and scrambled) by a modulator (MOD) 218. The modulated data is then provided to a transmitter unit (TMTR) 222 and conditioned (e.g., converted to one or more analog signals, amplified, filtered, and frequency upconverted) to generate a downlink signal. The downlink signal is routed through a duplexer (D) 224 and transmitted via an antenna 226 to the UEs.

Figure 2B:
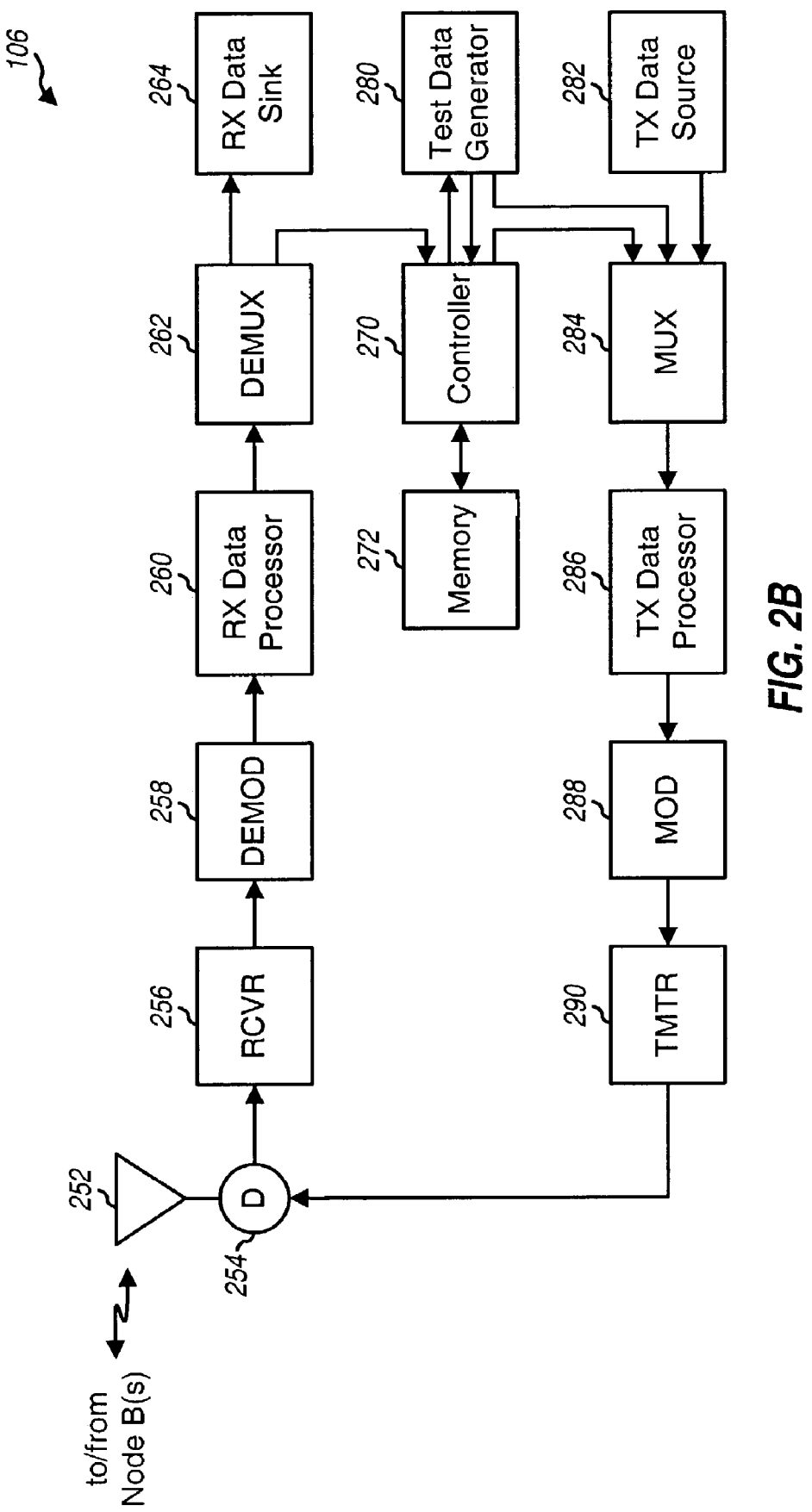

FIG. 2B is a block diagram of an embodiment of UE 106. The downlink signal is received by an antenna 252, routed through a duplexer 254, and provided to a receiver unit (RCVR) 256. Receiver unit 256 conditions (e.g., filters, amplifies, and frequency downconverts) the received signal and further digitizes the conditioned signal to provide samples. A demodulator (DEMOD) 258 receives and processes (e.g., descrambles, despreads, and data demodulates) the samples to provide recovered symbols. Demodulator 258 may implement a rake receiver that is capable of processing multiple signal instances in the received signal. A receive (RX) data processor 260 then deinterleaves and decodes the recovered symbols, checks each received block, and provides decoded data to a demultiplexer (DEMUX) 262. Demultiplexer 262 provides decoded traffic data to an RX data sink 264 and decoded test data to a controller 270. Demodulator 258 and RX data processor 260 may be operated to process data received on multiple transport channels.

On the uplink, a multiplexer 284 receives results of downlink transport channel testing from controller 270, test data from a test data generator 280 (for testing the uplink), and traffic data from a TX data source 282. Depending on the current operating mode of UE 106, multiplexer 284 provides the proper combination of data and/or test results to a TX data processor 286. The data and/or test results are then processed (e.g., formatted, encoded, and interleaved) by TX data processor 286, further processed (e.g., spread and scrambled) by a modulator 288, and conditioned by a transmitter unit 290 to generate an uplink signal. The uplink signal is routed through duplexer 254 and transmitted via antenna 252 to one or more node Bs.

Referring back to FIG. 2A, the uplink signal is received by antenna 226, routed through duplexer 224, and conditioned and digitized by a receiver unit 228 to provide samples. The samples are further processed by a demodulator 232 and an RX data processor 234 to recover the transmitted data and test results. A demultiplexer 236 then provides the uplink traffic data to an RX data sink 238 and uplink test data and the downlink test results to a controller 220 for evaluation.

Controllers 220 and 270 may perform various functions related to the testing of the downlink and uplink transport channels, and may also direct the operation of various processing units within the node B and UE, respectively. For example, controllers 220 and 270 may direct the generation of test data and the processing of received test data. Memories 242 and 272 may store data and program codes used by various processing units within the node B and UE, respectively.

For efficient utilization of the available system resources, the wireless link between a base station and a terminal may be characterized. The link characterization information may then be used to schedule data transmission, determine data rate, allocate transmit power, and so on, for the terminal.

Techniques are provided herein to test a wireless link using configurable channels and rates. To test downlink channels, test data is generated at the node B by test data generator 240, processed, and transmitted from the node B to the UE. At the UE, the transmitted downlink test data is received, processed in a complementary manner, and provided to controller 270. Controller 270 further directs test data generator 280 to locally generate the test data, which is compared against the received test data. Various types of tests may be performed to test the downlink transport channels. Various performance and statistical data may be collected at the UE based on the results of the comparison between the received and generated test data. The testing of the uplink may be achieved in similar manner as that for the downlink.

In an aspect, a W-Markov test service is provided for the communication system. The W-Markov test service may be invoked to test and/or verify the performance of the downlink and/or uplink transport channels between the UE and a System Simulator (SS), which is an entity that resides in the UTRAN and is responsible for test services.

For clarity, the test techniques and W-Markov test service are specifically described for a W-CDMA system.

Transport Channels, AMR Modes, and Frame Structure

Many newer generation CDMA systems are capable of concurrently supporting various types of services such as voice, packet data, and so on. For example, in W-CDMA, data for various services may be transmitted on the downlink and uplink using one or multiple transport channels. A dedicated channel (DCH) may be assigned for voice and certain types of data, and a downlink shared channel (DSCH) and/or a high-speed downlink shared channel (HS-DSCH) may be assigned for high-speed packet data. The DCH, DSCH, and HS-DSCH are different types of transport channels defined by W-CDMA.

For W-CDMA, the data for various services are initially processed as logical channels at upper layers. These logical channels are then mapped to transport channels at a transport layer. The data to be sent on each transport channel is processed based on a transport format (TF) selected for that transport channel. The transport format defines various processing parameters such as a transmission time interval (TTI) over which the transport format and interleaving apply, the size of each transport block of data, the number of transport blocks within each TTI, the coding scheme to use for the TTI, the rate matching parameters, and so on. The TTI may be specified as 10, 20, 40, or 80 msec. Each TTI may be used to send a transport block set containing $N_B$ equal-sized transport blocks, where $N_B$ and the transport block size are specified by the transport format for the TTI. For each transport channel, the transport format can change dynamically from TTI to TTI. The set of transport formats that may be used for a given transport channel is referred to as a transport format set (TFS), and a single transport format in the set is selected for use for the transport channel for each TTI. Different transport channels may be associated with different transport format sets.

The data for each transport channel is processed (e.g., coded, interleaved, and rate matched) in accordance with the transport format to be used in the current TTI for that transport channel. If the TTI is longer than 10 msec, then the bits within the TTI are segmented into multiple transport channel frames. Each transport channel frame corresponds to a portion of the TTI that is to be transmitted in a (10 msec) physical channel radio frame (or simply, radio frame). The transport channel frames for each transport channel are further processed (e.g., interleaved) and mapped to one or more physical channels assigned for that transport channel.

W-CDMA utilizes an Adaptive Multi-Rate (AMR) speech coding scheme whereby speech data may be encoded based on one of a number of possible rates. The coded speech data is grouped into three classes, which are referred to as classes A, B, and C. Class A bits are the most important bits, class B bits are the next most important, and class C bits are the least important. Because of the difference in importance, the bits for each class may be transmitted on a different transport channel with different processing parameters. These parameters may specify the error correction and detection coding, rate matching, and so on, and may be selected to be commensurate with the level of importance for the associated class. For example, convolutional encoding and cyclic redundancy check (CRC) may be used for class A bits, convolutional encoding but no CRC may be used for class B bits, and no convolutional encoding or CRC may be used for class C bits.

The bits for classes A, B, and C may be processed as three logical channels that are then mapped to three transport channels (i.e., three DCHs). The associated control data may be carried on a dedicated control channel (DCCH), which is another logical channel that is mapped to a fourth transport channel (i.e., another DCH). The TTIs for the test data carrying transport channels may be the same or different from the TTI for the control data carrying transport channel. The data for all four transport channels for each (longest) TTI may then be multiplexed into a single coded composite transport channel (CCTrCH). The bits in the CCTRCH are further processed (e.g., interleaved) and segmented among one or more physical channels used for data transmission. The transport channel processing and multiplexing are described in further detail in the document 3GPP TS 34.108 V4.2.1, which is publicly available and incorporated herein by reference. The radio parameter sets listed in 3GPP TS 34.108 may be used for the transport channels for various AMR modes.

Table 1 lists the AMR modes supported by W-CDMA and their associated data rates and block sizes. Table 1 also lists the number of bits for each of the three classes for the various AMR modes.

TABLE 1

AMR Modes

| AMR Mode Index | Mode Description | Total Class A, B, & C | Class A | Class B | Class C |
|---|---|---|---|---|---|
| 0 (AMR4.75) | 4.75 kbps speech | 95 | 39 | 56 | 0 |
| 1 (AMR5.15) | 5.15 kbps speech | 103 | 49 | 54 | 0 |
| 2 (AMR5.90) | 5.90 kbps speech | 118 | 55 | 63 | 0 |
| 3 (AMR6.70) | 6.70 kbps speech | 134 | 58 | 76 | 0 |
| 4 (AMR7.40) | 7.40 kbps speech | 148 | 61 | 87 | 0 |
| 5 (AMR7.95) | 7.95 kbps speech | 159 | 75 | 84 | 0 |
| 6 (AMR10.2) | 10.2 kbps speech | 204 | 65 | 99 | 40 |
| 7 (AMR12.2) | 12.2 kbps speech | 244 | 81 | 103 | 60 |
| 8 | GSM-AMR SID | 39 | 39 | 0 | 0 |
| 9 | GSM-EFR SID | 42 | 42 | 0 | 0 |
| 10 | IS-641 SID | 38 | 38 | 0 | 0 |
| 11 | PDC-EFR SID | 37 | 37 | 0 | 0 |
| 12–14 | For Future Use | N/A | N/A | N/A | N/A |
| 15 | NULL | 0 | 0 | 0 | 0 |

Number of Bits/20-msec Block

As shown in Table 1, AMR modes 0 through 7 correspond to eight different AMR speech data rates ranging from 4.75 kbps to 12.2 kbps. AMR modes 8 through 11 are used to send different types of silence descriptor (SID). A SID frame includes coded background noise and is sent every 160 msec during periods of silence. AMR modes 12–14 are reserved for future use, and AMR mode 15 represents no data transmission for silence periods. The total number of bits in a 20-msec AMR frame ranges from 95 to 244 for AMR modes 0 through 7, respectively.

During testing, the downlink and uplink timelines are each subdivided into independent "test intervals" (which may also be referred to as "segments"). In an embodiment, each test interval spans 2.56 seconds and covers a number of test frames. Each test frame includes test data for one transport channel and spans one TTI, which may be configured as 10, 20, 40, or 80 msec. The test interval would cover 128 test frames if test frame is associated with a TTI of 20 msec. The test interval may also be defined to span some other time duration or a particular number of test frames.

The transmitter and receiver need to be synchronized in time to allow for the testing of the transport channels. Since a W-CDMA system may be operated in an asynchronous manner, there is no common system time for the node Bs in the system. In an embodiment, the transmitter and receiver are synchronized based on a Connection Frame Number (CFN) defined by W-CDMA. The CFN is a frame counter that is used for synchronization of the transport channels between the UTRAN and UE. One CFN is maintained for each transport channel type (e.g., one CFN for the DCH). The CFN for each transport channel type (except for the paging channel) has a range of 0 to 255 and is incremented by one for each (10 msec) radio frame. The CFN is not transmitted over the air for each transport block set that is sent in one TTI. Instead, the CFN is mapped to a System Frame Number (SFN) of the first radio frame used to send the transport block set (i.e., the CFN is the 8 least significant bits of the SFN). The SFN is broadcast in a broadcast channel (BCH).

The first test frame of each test interval is referred to as a synchronization frame. In an embodiment, the synchronization frames for each link are determined based on (1) a 32-bit International Mobile Subscriber Identification number (IMSI) that uniquely identifies a UE and (2) the CFN of the transport channels (e.g., DCH) being tested for that link. The synchronization frames may also be determined based on some other identifier and/or some other information, and this is within the scope of the invention.

In an embodiment, the downlink synchronization frames may be defined as those frames for which the least significant nine bits of the CFN are equal to the least significant nine bits of the bit-wise exclusive-OR of the IMSI and hexadecimal value 0x55555555 (the notation "0x . . . " denotes a hexadecimal number). Similarly, the uplink synchronization frames may be defined as those frames for which the least significant nine bits of the CFN are equal to the least significant nine bits of the bit-wise exclusive-OR of the IMSI and hexadecimal value 0x2AAAAAAA. The exclusive-OR with 0x2AAAAAAA toggles the even-numbered bits of the IMSI, and the exclusive-OR with 0x55555555 toggles the odd-numbered bits of the IMSI. The exclusive-OR operation staggers the synchronization frames of various UEs in time, which may reduce the peak loading at the node B. The downlink and uplink are thus associated with different (time-wise) synchronization frames.

As described in further detail below, the synchronization frames for each link are used to initialize a pseudo-random number generator associated with that link. Test service initialization and control operations also take effect prior to the start of each synchronization frame.

Test Data Generation

One or multiple transport channels may be used to test a particular communication link (e.g., the downlink or uplink). For example, four transport channels may be used for the three AMR classes of bits and control data. Each transport channel may be independently configured with a set of parameters (e.g., for coding, rate matching, TTI, and so on). The TTI for each transport channel may be selected as 10, 20, 40, or 80 msec. If the transport channels are associated with different TTIs, then the test data generation is based on the longest TTI for all configured transport channels.

A data block is generated for each TTI and would include all test data needed in one TTI for all transport channels. The data block may be partitioned into one or multiple test frames, one test frame for each transport channel. Each test frame includes data for one transport channel and spans one TTI. The test frames for different transport channels may have different sizes.

Various types of test data may be used to test the wireless link. These test data types may include defined data sequences, pseudo-random data, and so on. The test data type may be configurable and selected during test setup.

In one test configuration, one or more defined data sequences are used to test the transport channels. Various schemes may be used to generate these data sequences. In one scheme, a single byte pattern is used to fill up the data block. This byte pattern may be an all ones pattern ("11111111") or some other user-defined byte pattern. If the data block includes more than a whole number of octets (e.g., 171 bits), each whole octet may be filled with the byte pattern and the remaining bits may be filled with zeros ('0'). The use of a defined data sequence may simplify the test data generation at the transmitter and receiver.

In another test configuration, pseudo-random data is used to test the wireless link. This data may be generated using one or more pseudo-random number (PRN) generators, as described in further detail below.

Figure 3:
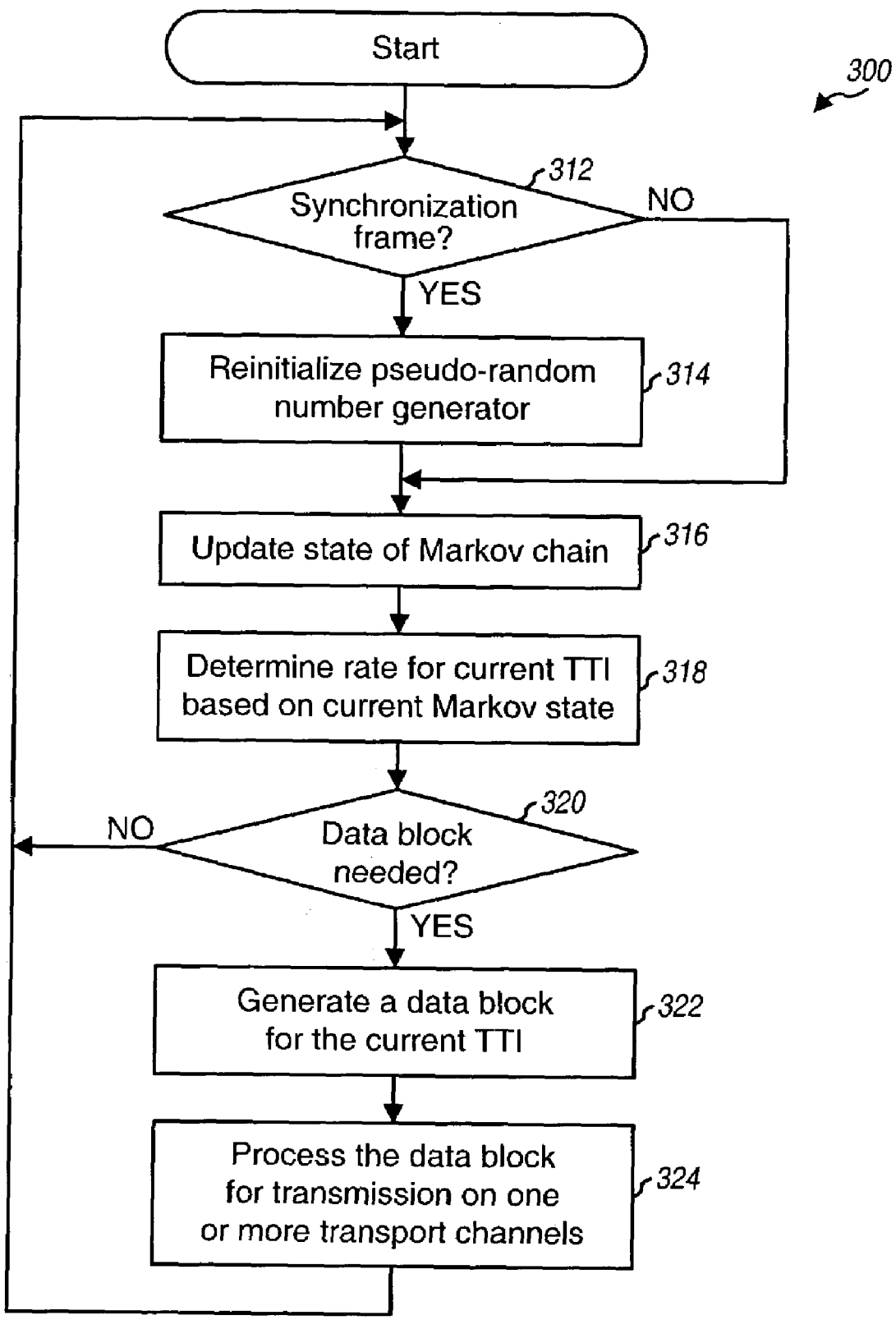
FIG. 3 shows a process for testing at least one transport channel for a particular communication link.

FIG. 3 is a flow diagram of an embodiment of a process 300 for testing one or more transport channels for a communication link (e.g., the downlink or uplink).

To ensure synchronization between the pseudo-random number generators used by the UE and SS to generate test data, these generators are re-initialized at the start of each test interval. Thus, a determination is made whether or not it's time to synchronize the pseudo-random number generator (step 312). If the answer is yes, then the pseudo-random number generator is re-initialized (step 314).

The downlink and uplink transport channels may be tested in a manner to simulate voice communication. A first-order Markov model may be used to model voice activity, as described above. In this case, the state of the Markov model is updated for each TTI (step 316). The rate to use for the current TTI (e.g., full or null rate) is then determined based on the current state of the Markov model (step 318). A determination is then made whether or not test data is to be transmitted for the current TTI based on the rate (step 320). If test data is to be transmitted, then a block of test data is generated (step 322). The data block is further processed for transmission on one or more transport channels configured for the link under test (step 324). These steps are described in further detail below.

Figure 4:
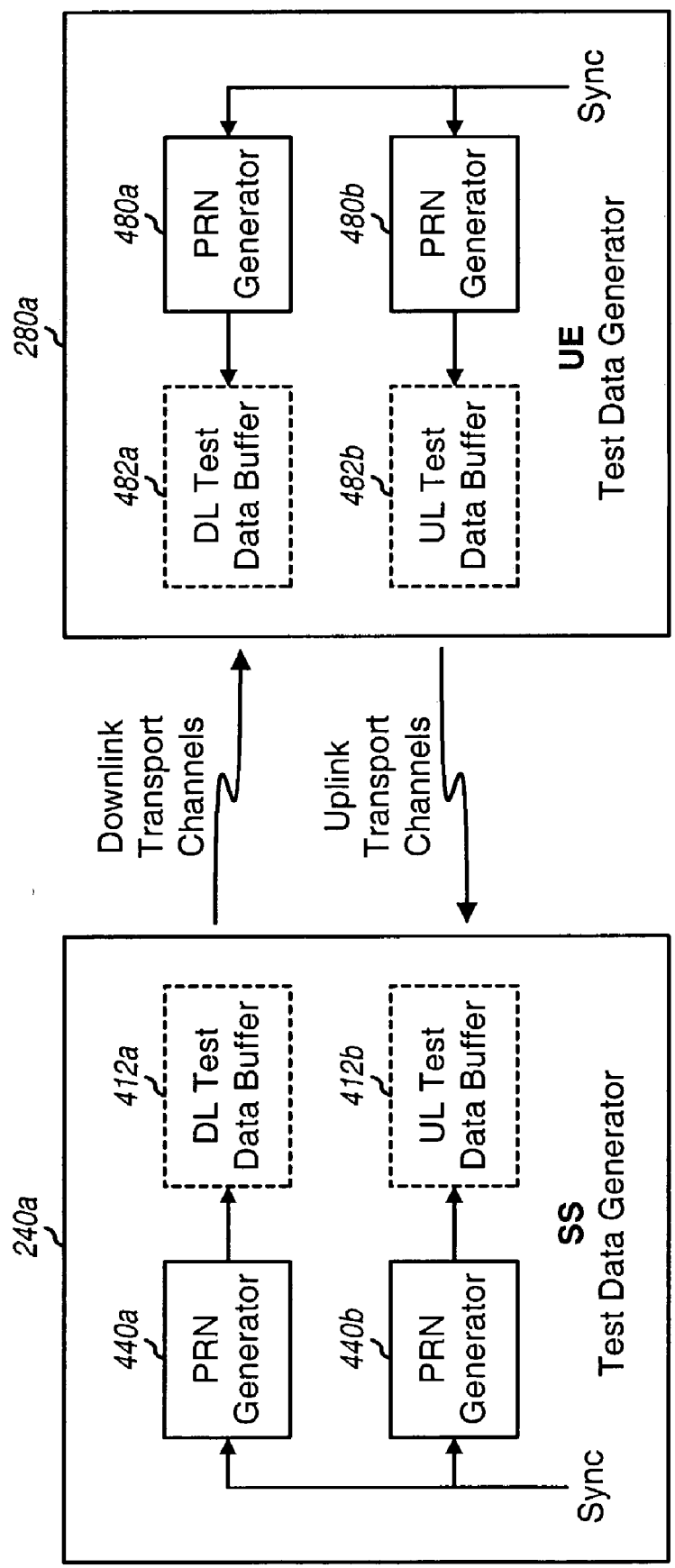
FIG. 4 shows test data generators used to generate pseudo-random test data for the downlink and uplink transport channels.

FIG. 4 is a block diagram showing an embodiment of test data generators 240*a* and 280*a* used to generate pseudo-random test data for the downlink and uplink transport channels. In an embodiment, two independent pseudo-random number generators are used for the W-Markov test service, one generator for the downlink transport channels and another for the uplink transport channels.

In the embodiment shown in FIG. 4, the SS is associated with pseudo-random number generators 440*a* and 440*b* used to generate pseudo-random data for the transport channels on the downlink and uplink, respectively. Similarly, the UE is associated with pseudo-random number generators 480*a* and 480*b* used to generate pseudo-random data for the transport channel on the downlink and uplink, respectively. Pseudo-random number generator 440*a* is synchronized to generator 480*a* (its counterpart) prior to each downlink synchronization frame. Similarly, pseudo-random number generator 440*b* is synchronized to its counterpart generator 480*b* prior to each uplink synchronization frame.

Pseudo-random number generators 440*a* and 480*b* for the transmit side are also used to select the rate for each TTI (e.g., full or null rate) as well as to generate the pseudo-random data for the TTI. Pseudo-random number generators 440*b* and 480*a* for the receive side are used to emulate the test data generation at the receive end of the link, which enables the test service to verify if the transmitted test data was received error free.

Test data buffers 412a and 412b may optionally be used to store downlink and uplink test data, respectively, at the SS. Similarly, test data buffers 482a and 482b may optionally be used to store downlink and uplink test data, respectively, at the UE.

Various designs may be used for the pseudo-random number generators. In an embodiment, each pseudo-random number generator exhibits the following linear congruential relationship:

$$x_i = (a \cdot x_{i-1}) \bmod m .$$   Eq. (1)

In an embodiment, $a=7^5=16,807$, $m=2^{31}-1=2,147,483,647$, and $x_{i-1}$ and $x_i$ are successive outputs of the pseudo-random number generator and are 31-bit integers. Other values may also be used for a and m.

The pseudo-random number generator for each link is initialized prior to each synchronization frame for that link. The initialization may be achieved as follows:

```
{
    a = 16807
    m = 2147483647
    PRNGx = seed value              // seed the generator
    PRNGx = PRNGx XOR TOGGLE        // toggle some of the bits
    PRNGx = PRNGx AND 0x7FFFFFFF    // zero out the MSB
    PRNGx = (a•PRNGx) mod m         // iterate the generator
    PRNGx = (a•PRNGx) mod m         //   four times
    PRNGx = (a•PRNGx) mod m
    PRNGx = (a•PRNGx) mod m
}
```

In the above pseudo-code, PRNGx denotes the content (or state) of the x-th pseudo-random number generator, which may be the one used for the downlink or uplink. The seed for the pseudo-random number generator may be selected as the system time (in frames) of the synchronization frame. For example, the SFN of the downlink synchronization frame may be used as the seed for the pseudo-random generator for the downlink, and the SFN of the uplink synchronization frame may be used as the seed for the pseudo-random generator for the uplink. TOGGLE is a value used to toggle some of the bits of the seed, and may be selected as, for example, 0x2AAAAAAA for the generator used for the downlink and 0x55555555 for the generator used for the uplink.

Once initialized, each pseudo-random number generator may be iterated as many times as needed in each TTI to generate the required pseudo-random data. During test data generation, whenever a pseudo-random number is needed, the current value of the variable PRNGx is retrieved and used, and the variable PRNGx is updated (i.e., iterated) once as shown in equation (1). The current value of PRNGx corresponds to $x_{i-1}$ and the new value of PRNGx corresponds to $x_i$ in equation (1).

Using 31-bit numbers from the pseudo-random number generator to generate test data is inefficient, from an implementation point of view, because the number is not octet aligned. It is easier to build a data block with numbers that are octet aligned. Thus, in an embodiment, only the most significant 24 bits of each 31-bit number for PRNGx are used because of better randomness properties and ease of usage, and the least significant 7 bits are discarded. Each iteration of the pseudo-random number generator thus provides a 24-bit pseudo-random number $y_n(k)$.

Figure 5:
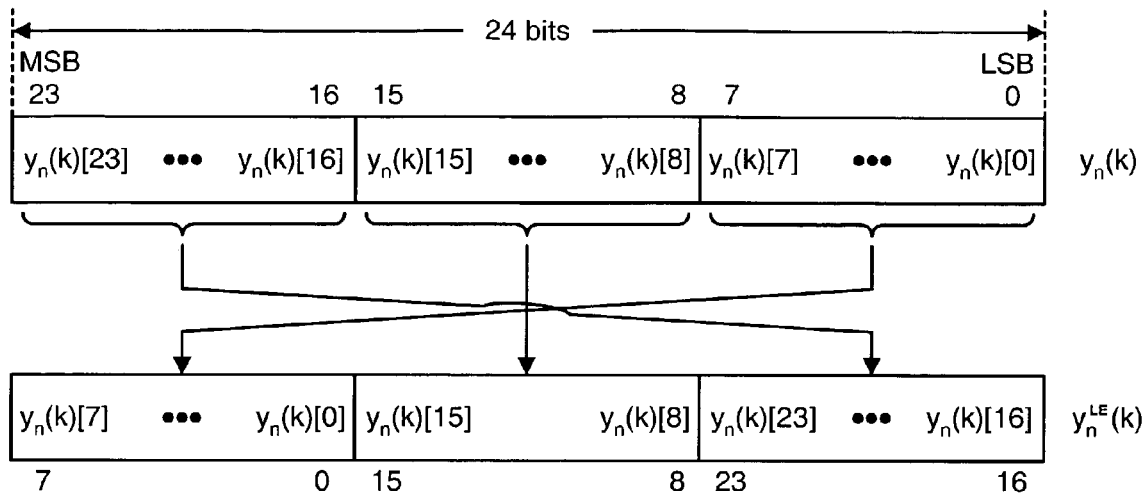
FIG. 5 illustrates the reshuffling of a 24-bit pseudo-random number to generate 24 bits of test data.

FIG. 5 is a diagram that illustrates the reshuffling of a 24-bit pseudo-random number $y_n(k)$ to generate 24 bits of test data. The least significant bits of the 24 bit number are "less random" than the most significant bits, and are thus shuffled to the left. In an embodiment, the 24-bit pseudo-random number from the pseudo-random number generator is reshuffled and stored in "little-endian" order. The reshuffling is achieved by swapping the least significant byte in the 24-bit number $y_n(k)$ with the most significant byte to generate the reshuffled number $y_n^{LE}(k)$.

For each TTI of each link under test, the W-Markov test service iterates the associated pseudo-random number generator as many times as needed to generate the required number of bits for the data block to be transmitted in that TTI on the transport channels configured for that link. The required number of iterations is dependent on the rate for the current TTI, which determines the number of required bits. Table 2 lists the various AMR rates, the required number of bits for each 20-msec data block, and the required number of iterations P(n). Different number of iterations may be required for data blocks for other TTIs.

TABLE 2

| AMR Mode Index | No. Bits Required | No. of Pseudo-Random Numbers P(n) | No. Bits Generated | Bits Discarded |
| --- | --- | --- | --- | --- |
| 0 (AMR4.75) | 95 | 4 | 96 | 1 |
| 1 (AMR5.15) | 103 | 5 | 120 | 17 |
| 2 (AMR5.90) | 118 | 5 | 120 | 2 |
| 3 (AMR6.70) | 134 | 6 | 144 | 10 |
| 4 (AMR7.40) | 148 | 7 | 168 | 20 |
| 5 (AMR7.95) | 159 | 7 | 168 | 9 |
| 6 (AMR10.2) | 204 | 9 | 216 | 12 |
| 7 (AMR12.2) | 244 | 11 | 264 | 20 |
| 8 (AMR SID) | 39 | 2 | 48 | 9 |
| 9 (EFR SID) | 42 | 2 | 48 | 8 |
| 10 (IS-641 SID) | 38 | 2 | 48 | 10 |
| 11 (PDC SID) | 37 | 2 | 48 | 11 |

To generate a block of test data for a particular AMR rate for one TTI, the pseudo-random number generator is iterated P(n) times to generate P(n) pseudo-random numbers, where P(n) is given in Table 2 for each AMR rate. Each iteration provides a 24-bit pseudo-random number $y_n(k)$, for $k=\{1, 2, \ldots P(n)\}$, where n denotes the n-th TTI and k denotes the k-th iteration for the n-th TTI. As an example, to generate 244 test data bits required for an AMR 12.2 data block, the pseudo-random number generator is iterated 11 times to produce 26 test data bits (11·24=264). After the reshuffling, the AMR 12.2 data block would include the following sequence:

$y_n^{LE}(1), y_n^{LE}(2), y_n^{LE}(3), \ldots, y_n^{LE}(9), y_n^{LE}(10),$
$'y_n^{LE}(11)[23], \ldots, Y_n^{LE}(11)[20]'.$ As noted above, the three AMR classes of bits may be transmitted on three different transport channels. In this case, the bits for the three AMR classes may be obtained from the data block in a specific manner. For example, class A bits may be obtained first from the data block, the class B bits may be obtained next, and the class C bits may be obtained last. This allows for independent testing of the three transport channels and the three classes of bits.

To generate 39 test data bits required for an AMR SID data block, the pseudo-random number generator is iterated twice to generate two pseudo-random numbers with 48 test data bits. The 39 bits for the AMR SID data block are then obtained from the 24 bits in the first reshuffled pseudo-random number $y_n^{LE}(1)$ and the 15 most significant bits in the second reshuffled pseudo-random number $y_n^{LE}(2)$. The AMR SID data block would then include the following sequence:

$y_n^{LE}(1), 'y_n^{LE}(2)[23]\ldots y_n^{LE}(2)[9]'$.

A test data buffer may be used to store all or a portion of the test data required for a given test interval. The pseudo-random number generator may be iterated a number of times to generate pseudo-random data that may be stored in the test data buffer. Thereafter, test data for each TTI may be retrieved from the buffer as needed.

Multi-Rate Testing

Many CDMA systems support multiple data rates for voice communication. For example, in IS-95 and cdma2000, voice data for each 20-msec frame may be coded at one of four possible rates depending on the amount of speech activity during the frame. These four rates are referred to as full, half, quarter, and eighth rates and respectively correspond to 9.6, 4.8, 2.4, and 1.2 kbps in IS-95. The rate may change from frame to frame and is dependent on the amount of speech activity.

For W-CDMA, one of eight possible AMR rates may be assigned to a UE for voice communication. Unlike IS-95, a single AMR rate is typically configured at call setup and is thereafter used for the duration of the call (or unless reconfigured). However, voice data for each 20-msec frame may be coded at either the full rate (i.e., the assigned AMR rate) or the null rate (i.e., no data) depending on whether or not there is speech activity during the frame. A SID frame is sent for each silence period of 160 msec (i.e., one SID frame is transmitted for every 8 consecutive null rate frames).

The W-Markov test service can be designed to support testing of one or multiple AMR rates during a given test. The specific AMR rate(s) to test may be configured during test setup. Moreover, the test duration for each AMR rate may also be configured (e.g., as a specified or pseudo-random number of test intervals).

The W-Markov test service can be designed to support multiple test modes, including a fixed-rate test mode and a multi-rate test mode. For the fixed-rate test mode, the rate is fixed (e.g., at the full rate) for the duration of the test interval. For the multi-rate test mode, either the full rate or null rate is selected for each TTI, starting with the first synchronization frame. From the time of the W-Markov test service connection until the first synchronization frame, the test service can generate full rate data blocks comprised of all '1' bits.

For the multi-rate test mode, the rate for each TTI may be selected based on a first-order Markov model. Various designs for the Markov model may be defined to approximate voice activity, two of which are described below.

In a first Markov model, a 16-state Markov chain is defined for the four rates (i.e., full, half, quarter, and eighth rates) associated with a legacy Markov service option (SO). For this Markov model, voice activity is modeled based on the four legacy rates. The four legacy rates are mapped to full and null rates for the generation of test data for AMR, as described below.

The 16-state Markov chain may be defined based on knowledge gained from extensive modeling of voice activity based on the four legacy rates. A state in this Markov chain is defined by the rates for the current and prior TTIs. With four rates, there 16 possible states, which are labeled as S(n)=0 through 15. Table 3 lists the 16 states and the associated rates for the prior and current TTIs.

TABLE 3

| State S(n) | Prior Rate R(n − 1) | Current Rate R(n) | AMR Rate | Scaled Cumulative Transition Probability | | |
|---|---|---|---|---|---|---|
| | | | | A1 | B1 | C1 |
| 0  | 1   | 1   | 1 | 0     | 0     | 2916  |
| 1  | 1   | 1/2 | 1 | 0     | 20906 | 25264 |
| 2  | 1   | 1/4 | 0 | 0     | 0     | 0     |
| 3  | 1   | 1/8 | 0 | 0     | 0     | 0     |
| 4  | 1/2 | 1   | 1 | 0     | 0     | 4915  |
| 5  | 1/2 | 1/2 | 1 | 0     | 17170 | 24969 |
| 6  | 1/2 | 1/4 | 0 | 21856 | 25887 | 27099 |
| 7  | 1/2 | 1/8 | 0 | 0     | 0     | 0     |
| 8  | 1/4 | 1   | 1 | 0     | 0     | 4522  |
| 9  | 1/4 | 1/2 | 1 | 0     | 5472  | 16384 |
| 10 | 1/4 | 1/4 | 0 | 21856 | 21856 | 24576 |
| 11 | 1/4 | 1/8 | 0 | 28246 | 29622 | 30802 |
| 12 | 1/8 | 1   | 1 | 0     | 0     | 5472  |
| 13 | 1/8 | 1/2 | 1 | 0     | 6554  | 6554  |
| 14 | 1/8 | 1/4 | 0 | 28377 | 28934 | 29491 |
| 15 | 1/8 | 1/8 | 0 | 29753 | 32473 | 32571 |

In the 16-state Markov chain, each state can transition to one of four possible states. For example, state 0 can only transition to state 0, 1, 2, or 3, depending on the selected rate for the current TTI, state 1 can only transition to state 4, 5, 6, or 7, and so on. In general, if the state S(n−1) for the prior TTI is equal to k, then the state S(n) for the current TTI needs to satisfy the following constraint:

$S(n) \in \{(4 \times k) \bmod 16, (4 \times k+1) \bmod 16, (4 \times k+2) \bmod 16, (4 \times k+3) \bmod 16\}$.

Once the new state S(n) is determined, the corresponding legacy rate R'(n) for the current TTI can be expressed as:

$$R'(n) = \frac{1}{2^{(S(n) \bmod 4)}}. \quad \text{Eq (2)}$$

The 16 states in the 16-state Markov chain are defined based on the four possible legacy rates for the current and prior TTIs. The four legacy rates may be mapped to the full and null rates for AMR as shown in Table 4.

TABLE 4

| Legacy Markov SO Rate R'(n) | AMR Rate R(n) |
|---|---|
| 1   | 1 |
| 1/2 | 1 |
| 1/4 | 0 |
| 1/8 | 0 |

In Table 4, R(n)=1 corresponds to the full rate for the selected AMR mode (which is one of AMR modes 0 through 7 in Table 1). R(n)=0 corresponds to the null rate (which is AMR mode 15). For the null rate, a SID frame of a particular type (which is one of AMR modes 8 through 11 in Table 1) is transmitted for every 160 msec of null period.

Figure 6:
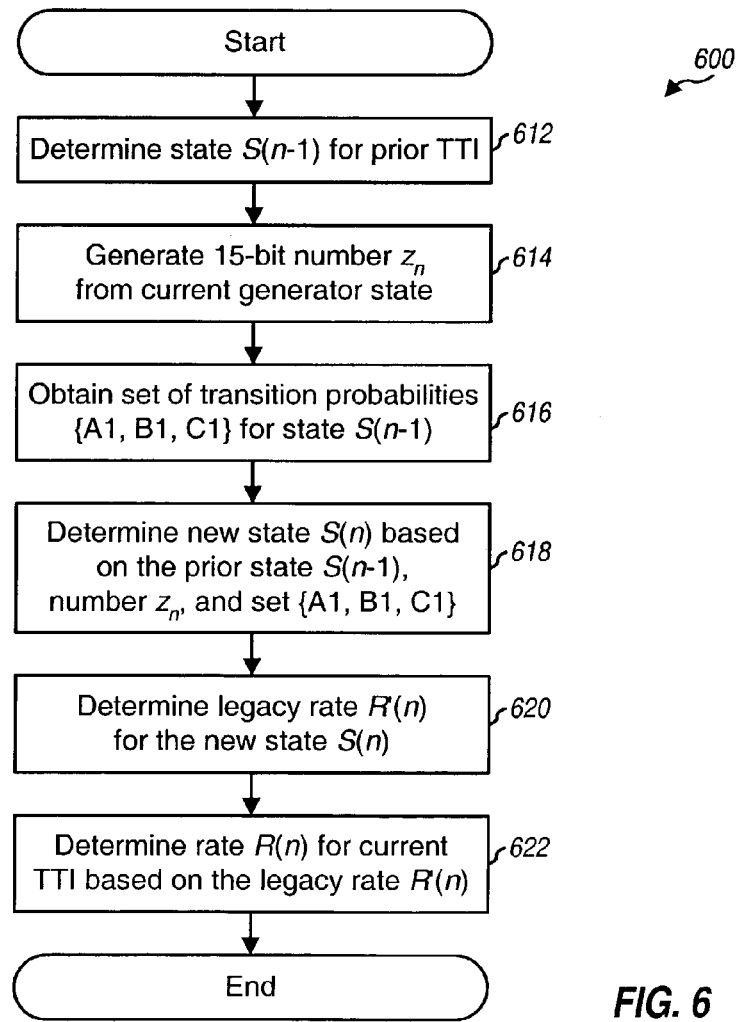
FIG. 6 shows a flow diagram of a process for selecting the rate for each TTI based on a 16-state Markov chain.

FIG. 6 is a flow diagram of an embodiment of a process 600 for selecting the rate for each TTI based on the 16-state Markov chain. For each TTI (including the TTI for the synchronization frame), the state S(n−1) of the Markov chain for the prior TTI is initially ascertained (step 612). The present state of (i.e., the current pseudo-random number from) the pseudo-random number generator is then used to generate two numbers: a 24-bit number $y_n(1)$ and a 15-bit number $z_n$ (step 614). The number $y_n(1)$ includes the 24 most significant bits of the pseudo-random number and is used to generate the first three bytes of the data block for the TTI, as described above. The number $z_n$ includes the 15 least significant bits of $y_n(1)$ and is used to determine the state S(n) for the current TTI.

To determine the new state S(n) for the current TTI, a set of scaled cumulative transition probabilities {A1, B1, and C1} is obtained from the last three columns of Table 3 for the state S(n−1) (step 616). For example, if S(n−1)=9, then the set would include {A1=0, B1=5472, and C1=16384}. The new state S(n) is then determined based on the prior state S(n−1), the number $z_n$, and the set of transition probabilities {A1, B1, and C1} obtained for S(n−1) (step 618).

In an embodiment, the new state S(n) may then be determined using a pseudo code, as follows:

```
{
   if (zn < A1)
      s(n) = (4*s (n−1)+3) mod 16
   elseif (A1 ≤ zn < B1)
      s(n) = (4*s(n−1)+2) mod 16
   elseif (B1 ≤ zn < C1)
      s(n) = (4*s(n−1)+1) mod 16
   elseif (zn ≥ C1)
      s(n) = (4*s(n−1)) mod 16
   endif
}
```

For the above example, if S(n−1)=9, then the rate for the prior TTI is half, and the next state can be 4, 5, 6, or 7, as shown in Table 3. The new state S(n) is equal to four if $z_n$<0, five if $z_n$<5472, six if 5472 ≤$z_n$<16384, and seven if $z_n$≥16384. In effect, the eighth rate is selected for the current TTI if $z_n$<A1, the quarter rate is selected if A1≤$z_n$≤B1, the half rate is selected if B1≤$z_n$≤C1, and the full rate is selected if $z_n$≥C1.

The legacy rate R'(n) for the new state S(n) is then determined (step 620). To generate test data for AMR, the rate R(n) to use for the current TTI is then determined based on the legacy rate R'(n) (step 622).

The scaled cumulative transition probabilities {A1, B1, and C1} in Table 3 determine the transition between the 16 states of the 16-state Markov chain. These transition probabilities are selected to approximate voice activity in a typical telephone conversation.

As shown in FIG. 6, using the 16-state Markov chain, a 15-bit number $z_n$ is generated for each TTI and used to determine the new state S(n) for that TTI. The legacy rate R'(n) associated with the new state S(n) is then determined based on equation (2). This legacy rate R'(n) is then mapped to an AMR rate R(n), which is either the full or null rate, based on Table 4.

One 16-state Markov chain may be maintained by the SS for testing downlink transport channels, and another 16-state Markov chain may be maintained by the UE for testing uplink transport channels. The Markov chain for each link may be set to a known state (e.g., S(n)=15) at the start of the first synchronization frame for that link.

In a second Markov model, a 2-state Markov chain is defined for two rates—full and null rates. This 2-state Markov chain allows for testing in accordance with a pseudo-random ON/OFF activity that can attempt to model voice activity. For each TTI, the W-Markov test service provides either a data block for the full rate or a null block for no transmission.

Figure 7:
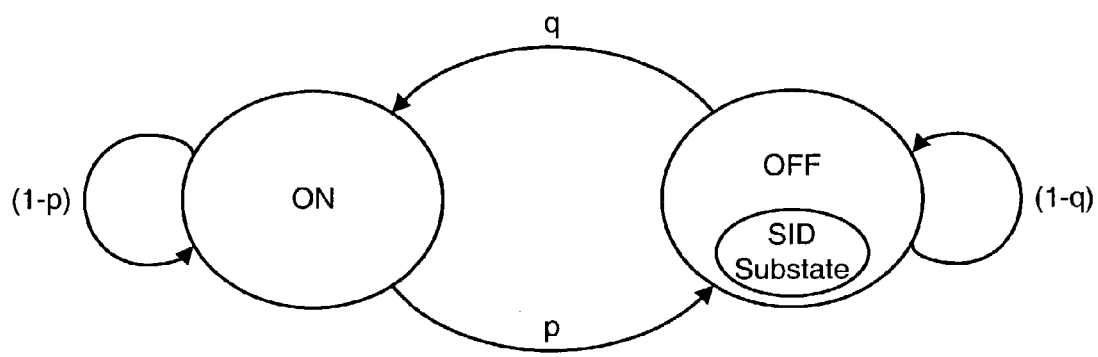
FIG. 7 shows a 2-state first-order Markov chain.

FIG. 7 is a diagram of an embodiment of the 2-state first-order Markov chain, which includes an ON state for the full rate and an OFF state for the null rate. The OFF state is associated with a SID substrate for the transmission of a SID frame every 160 msec of null transmission. The 2-state Markov chain is characterized by a probability p of transitioning from the ON state to the OFF state, and a probability q of transitioning from the OFF state to the ON state. The values of p and q may be specified by two parameters (e.g., ON_TO_OFF_PROB and OFF_TO_ON_PROB) in a message exchanged between the UE and SS.

The long-term average voice activity Va may be defined as:

$$Va = \frac{q}{p+q}. \quad \text{Eq (3)}$$

The average voice activity Va refers to the average number of TTIs in each ON duration versus the average number of TTIs in each ON/OFF cycle. The average voice burst length Vb may be defined as:

$$Vb = \frac{1}{p}. \quad \text{Eq (4)}$$

The average voice burst length Vb refers to the average number of TTIs in each ON duration.

For some testing, it may be desirable to select the average voice activity Va and the average voice burst length Vb, and then determine the corresponding values for p and q based on the desired Va and Vb. Combining and rearranging equations (3) and (4), the following are obtained:

$$Va = \frac{Vb \cdot q}{1 + Vb \cdot q}, \text{ and} \quad \text{Eq (5)}$$

$$Vb = \frac{Va}{(1 - Va) \cdot q}. \quad \text{Eq (6)}$$

Equation (5) indicates that for a given value of Vb, Va varies from 0 to Vb/(1+Vb) when q varies from 0 to 1. Equation (6) indicates that for a given value of Va, Vb varies from Va/(1−Va) to infinity when q varies from 1 to 0. For example, when Vb is selected as 2, Va should be smaller than 2/3, which indicates that the average voice activity Va cannot be set higher than 2/3 when Vb is set to 2. As another example, if Va is set to 7/10, then Vb is set greater than 7/3.

Figure 8:
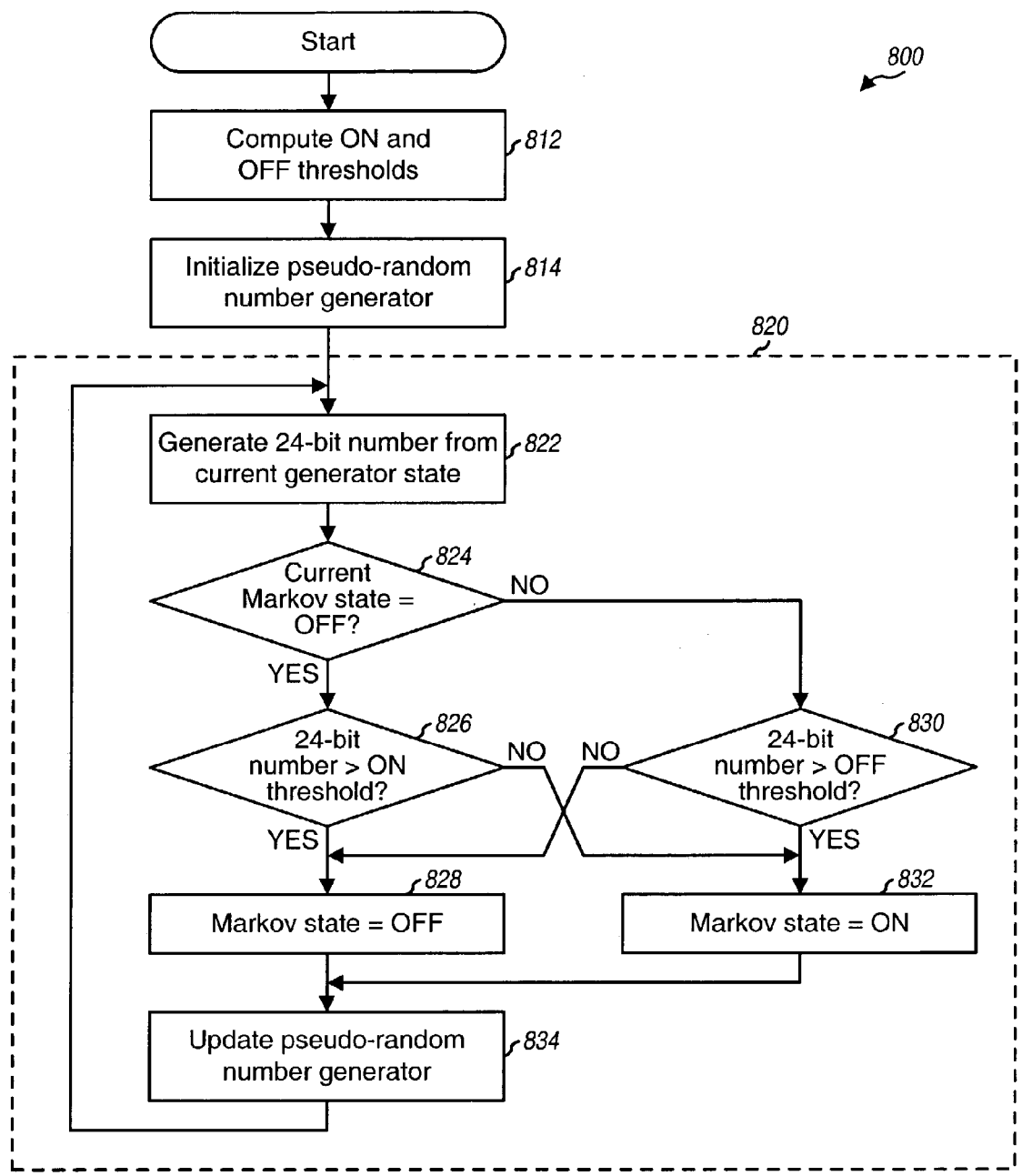
FIG. 8 shows a process for transitioning between the ON and OFF states of the 2-state Markov chain.

FIG. 8 is a flow diagram of an embodiment of a process 800 for transitioning between the ON and OFF states of the 2-state Markov chain for a particular communication link. In an embodiment, a 24-bit pseudo-random number $y_n(1)$ from the pseudo-random number generator is used to determine whether or not to transition from one state to another. Thus, 24-bit ON and OFF threshold values are computed (step 812) as follow:

ON_THRESHOLD=ROUND (16,777,215·q), and

OFF_THRESHOLD=ROUND (16,777,215·p).

As shown in FIG. 7, the probability of transition from the ON state to the OFF state is p, and the probability of transition from the OFF state to the ON state is q. Based on the 24-bit pseudo-random number, the W-Markov test service transitions from the ON state to the OFF state if this number is less than the OFF_THRESHOLD, and from the OFF state to the ON state if this number is less than the ON_THRESHOLD. Step 812 is typically performed once, prior to the first synchronization frame for the link after the W-Markov test service has been initialized.

The pseudo-random number generator for the link is initialized as described above at the start of each synchronization frame (step 814). The steps within box 820 are thereafter performed for each TTI. At the start of each TTI, the 2-state Markov chain is either in the ON state or the OFF state. A 24-bit pseudo-random number $y_n(1)$ may be used to drive the transition between the ON and OFF states for each TTI and is generated from the 31-bit current state of the pseudo-random number generator (step 822). A determination is next made whether or not the current Markov state for the link is OFF (step 824).

If the current Markov state is OFF, then a determination is made whether the 24-bit number is greater than or equal to the ON_THRESHOLD (step 826). If the answer is yes, then the W-Markov test service remains in the OFF state (step 828). Otherwise, the W-Markov test service transitions to the ON state (step 832). In either case, the process then proceeds to step 834.

If the current Markov state is ON (as determined in step 824), then a determination is made whether the 24-bit number is greater than or equal to the OFF_THRESHOLD (step 830). If the answer is yes, then the W-Markov test service remains in the ON state (step 832). Otherwise, the W-Markov test service transitions to the OFF state (step 828).

At step 834, the pseudo-random number generator is iterated once, as shown in equation (1), to update the state of the generator.

The 2-state Markov chain allows test data to be provided in a pseudo-random manner based on a particular average activity and burst length. One 2-state Markov chain may be maintained by the SS for testing downlink transport channels, and another 2-state Markov chain may be maintained by the UE for testing uplink transport channels. The 2-state Markov chain for each link may be set to a known state (e.g., OFF) at the start of the first synchronization frame for that link.

Figure 9:
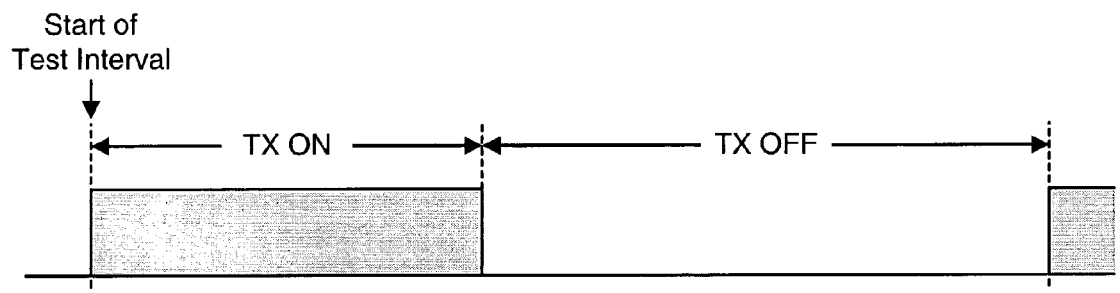
FIG. 9 illustrates the generation of test data based on a deterministic ON/OFF transmission activity.

FIG. 9 illustrates the generation of test data based on a deterministic ON/OFF activity. For this embodiment, test data is transmitted for a particular ON duration, followed by null transmission for a particular OFF duration, followed by test data transmission for another ON duration, and so on. The ON and OFF durations may be configurable and negotiated between the SS and UE. Also, the ON/OFF cycles may be periodic or non-periodic. The ON/OFF cycle may also be designated to start at the beginning of a synchronization frame. The ON and OFF durations may be selected such that (1) each test interval includes one ON/OFF cycle, (2) a test interval includes multiple ON/OFF cycles, or (3) an ON/OFF cycle spans multiple test intervals.

In an embodiment, the ON duration for test data transmission and the OFF duration for no transmission may be specified by two parameters in a message exchanged between the UE and SS.

Other schemes may also be used to provide data to achieve the desired transmission activity, and this is within the scope of the invention.

Activation and Deactivation of W-Markov Test Service

Figure 10:
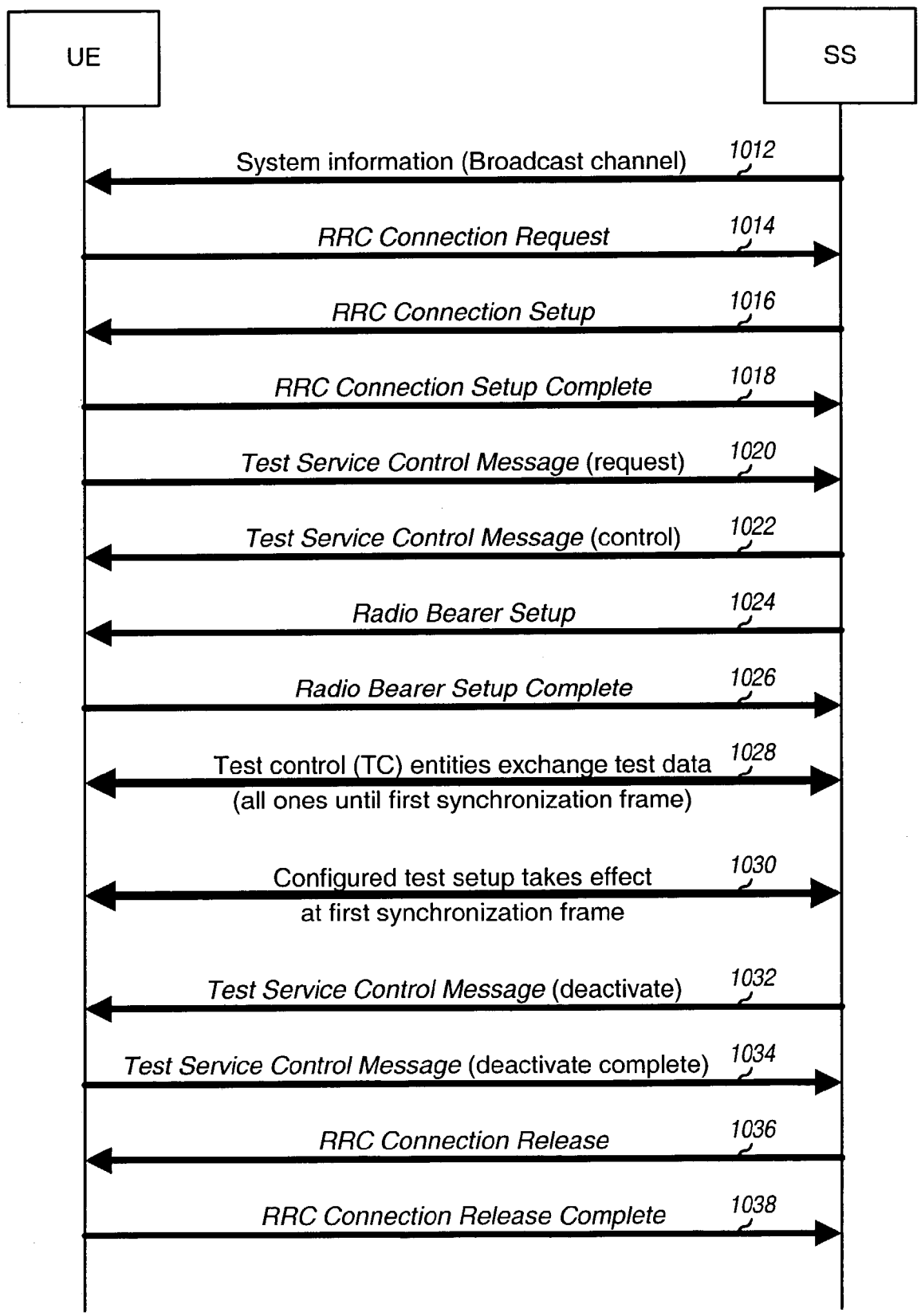
FIG. 10 shows a process for initiating and completing a test call by the UE.

FIG. 10 illustrates an embodiment of a process for initiating and completing a test call by the UE. Initially, the UE receives system information sent on a broadcast channel (step 1012). To initiate a call of any type, the UE sends a request to establish a Radio Resource Control (RRC) connection via an RRC Connection Request message (step 1014). The RRC connection may thereafter be established by an exchange of an RRC Connection Setup message and an RRC Connection Setup Complete message between the SS and UE (steps 1016 and 1018). Steps 1012 through 1018 are performed for all types of calls.

Once assigned a dedicated channel, the UE can initiate the test service. In this case, the UE and SS can negotiate the test configuration via an exchange of Test Service Control Message (steps 1020 and 1022). The UE may propose values for various test parameters. The SS can reject, accept, or modify these proposed values. Steps 1020 and 1022 are performed for test calls, and this test service configuration is described in further detail below.

A radio bearer test mode is then activated by an exchange of a Radio Bearer Setup message and a Radio Bearer Setup Complete message (steps 1024 and 1026). This activation applies the various parameters that have been negotiated (e.g., number of transport channels to use, TTI, coding, match matching, and so on) to the lower layer. To summarize, RRC messages are exchanged to bring up a connection. Test service then negotiates the test mode details. The radio bearer is then configured according to the negotiated test configuration. The activation of the radio bearer test mode is described in further detail below.

Thereafter, test control (TC) entities at the UE and SS perform testing of the configured transport channels using the configured parameters and rates. In an embodiment, the UE and SS exchange all ones test data until the first synchronization frame (step 1028). At the start of the first synchronization frame, the configured test setup takes effect and the pseudo-random number generators may be initialized (if pseudo-random data is to be used for testing) (step 1030). The testing is performed until an entity decides to end the test. The testing is then terminated via an exchange of Test Service Control messages between the UE and SS (steps 1032 and 1034). The call may then be torn down and the RRC connection may be closed via an exchange of an RRC Connection Release message and an RRC Connection Release Complete message (steps 1036 and 1038).

These various messages are described in further detail in the aforementioned 3GPP TS 34-108 V4.2.1 document. The SS can also initiate a test call with the UE. A process similar to that shown in FIG. 10 may be used for the SS-initiated test call.

The W-Markov function may be initiated by either the UE or SS. In an embodiment, either entity (i.e., the SS or UE) can initiate the radio bearer test mode in the other entity once an RRC connection has been established. A radio bearer is the service provided by Layer 2 for transfer of user data between the UE and SS. The SS can use an activate UE radio bearer procedure to get the UE into the test mode, and the UE can use an activate SS radio bearer procedure to get the SS into the test mode. In the test mode, either the SS or UE can set up the radio bearers to be terminated in the UE/SS test loop function without having to involve the Call Control (CC) or Session Management (SM). Moreover, while in the test mode, control mechanisms in other protocols (e.g., Non-Access Stratum (NAS) protocols but possibly not test control (TC) protocol) or UE/SS applications that can cause the RRC connection to be released can be disabled so as not to interfere with the testing.

Radio Bearer Test Mode Activation

An entity TA (which can be either the SS or UE) requests the other entity TB (which can be the UE or SS) to activate the radio bearer test mode on entity TB by an exchange of Test Service Control Message. In an embodiment, a timer is used to time-out the radio bearer activation process. Thus, entity TA starts a timer.

Once the entity TB activates its radio bearer test mode, it may be designated to perform the following:

accept any requested radio bearer setup from entity TA that is within the radio access capabilities of entity TB;

terminate all user plane radio bearer(s) in the test loop function of entity TB; and disable any control mechanisms in the NAS protocols or in any applications in entity TB that otherwise could cause the RRC connection to be released.

Once the radio bearer test mode has been activated, entity TB transmits a message to confirm that it has activated the radio bearer test mode. Upon receiving this message, entity TA stops the timer. If the timer expires prior to receiving this message, then entity TA indicates this and terminates the procedure.

Once the radio bearer test mode has been activated, testing may be performed until either entity (UE or SS) decides to terminate the test. This entity (T1) can deactivate the radio bearer test mode of the other entity (T2) if the RRC connection has been established and the other entity's radio bearer test mode is active. Entity T1 requests entity T2 to deactivate the radio bearer test mode by transmitting a Test Service Control Message. Entity T1 then starts the timer. When entity T2 receives this message, it deactivates the radio bearer test mode and returns to normal operation. Entity T2 then transmits a Test Service Control Message to confirm the deactivation.

Upon receiving the Test Service Control Message that confirms that the radio bearer test mode has been deactivated in entity T2, entity T1 stops the timer. If the timer expires prior to receiving this message, then entity T1 indicates this and terminates the procedure.

Test Service Configuration

The W-Markov test service is a service that may be negotiated and connected using the available service configuration and negotiation procedures. Either entity (i.e., the SS or UE) can propose or invoke test service specific functions for a Markov call by sending a message (e.g., a Test Service Control Message) to the other entity. This message may be sent such that an acknowledgement is requested or required from the receiving entity.

Via the message, the originating entity may propose values for various test parameters to be used during the test period. The originating entity may also be able to indicate the preferred parameter values for the downlink and uplink.

The receiving entity may accept or reject the proposed test parameter settings. If all the fields in the originating entity's directive are within acceptable ranges for the receiving entity, then the receiving entity may issue a directive that accepts the proposal. This directive may be sent to the originating entity via a response message (e.g., Test Service Control Message) that includes the same values, as proposed by the originating entity, for the various fields.

Alternatively, if the originating entity proposes a particular test setting that is not supported by or acceptable to the receiving entity, then the receiving entity may issue a directive that may include alternative values (i.e., counter-proposals) to the original proposed values. This directive may be sent to the originating entity via a response message that includes the proposed values in the fields supported and accepted by the receiving entity, and counter-proposed values in the fields not supported or accepted by the receiving entity.

Thus, via messaging and negotiation, the receiving entity is able to accept the originating entity's proposal, or reject the proposal and provide alternative values for test parameters. Upon receiving the response message from the receiving entity, the originating entity may accept the counter-proposed values or select new values that conform to the counter-proposed values. The originating entity may then send to the receiving entity another message proposing these new values. The negotiation process would continue until the test parameter values are acceptable to both entities.

Table 6 lists the various fields for a Test Service Control Message that may be used to configure the W-Markov test service. Other messages with different fields and formats may also be used for test service configuration, and this is within the scope of the invention.

TABLE 5

Test Service Control Message Fields

| Field/Parameter | Length (bits) | Definition |
| --- | --- | --- |
| PROTOCOL DISCRIMINATOR | 4 | This field is set to '1111' (see 3GPP TS 24.007 section 11.2.3.1.1) |
| SKIP INDICATOR | 4 | This field is set to '0000' (see 3GPP TS 24.007 section 11.2.3.1.2) |
| MESSAGE TYPE | 8 | This field is set to '01111100' (see 3GPP TS 24.007 11.2.3.2.2) |
| CTL_REC_TYPE | 8 | '00000000' - control directive for all physical channels carrying Markov test service traffic '00000001' to '11111111" - reserved |
| CONTROL_CODE | 8 | Control code field - set according to Table 6. |
| TEST_SERVICE | 2 | '00' - W-Markov test service '01' to '11' - reserved |
| CHANNEL_ DIRECTION | 2 | Indicates the channel direction for which the control directive applies: '00' - both downlink and uplink directions '01' - downlink direction only '10' - uplink direction only '11' - reserved |

TABLE 5-continued

Test Service Control Message Fields

| Field/Parameter | Length (bits) | Definition |
| --- | --- | --- |
| COPY_COUNTERS | 2 | Copy counters field. Set to '01' if the UE and SS are to copy counter values at the next synchronization frame, and to '00' otherwise. All other values are reserved. |
| CLEAR_COUNTERS | 2 | Clear counters field. Set to '01' if the UE and SS are to clear the counters at the next synchronization frame, and to '00' otherwise. All other values are reserved |
| DATA_SOURCE | 2 | '00' - use selectable data pattern to generate test data<br>'01' - use pseudo-random data to generate test data<br>'10' and '11' - Reserved. |
| FRAME_ACTIVITY | 3 | Frame activity field:<br>'000' - 16 State Legacy Rate Generation<br>'001' - 2 State Rate Generation<br>'010' to '111' - RESERVED |
| FLEX_TRANS_CONFIG | 3 | The set according to Table 12. |
| AMR_MODE_CHANGE | 0 or 4 | AMR mode change option - set according to Table 13. This field is present only if the TEST_SERVICE field is set to '00'. |
| SID_TYPE_TO_USE | 0 or 4 | SID type to be used - set according to Table 14. This field is present only if the TEST_SERVICE field is set to '00'. |
| UPLINK_DATA_CONFIG | 0 or 8 | Uplink data rate - set according to Table 7. |
| DOWNLINK_DATA_CONFIG | 0 or 8 | Downlink data rate - set according to Table 7. |
| TTI | 0 or 8 | Transport channel TTI - set according to Table 15. |
| RM | 0 or 8 | Transport channel rate matching attribute - set to the required value. |
| NUM_TRANSPORT_CHANNELS | 0 or 8 | Number of transport channels (N) that need to be configured. This field is present only if the FLEX_TRANS_CONFIG field is set to a value other than '000' or '001'. |
| TRANSPORT_CONFIG_DATA | 0 or 48*N | This field includes N records (as defined in Table 11) for the N transport channels to be configured. This field is present only if the FLEX_TRANS_CONFIG field is set to a value other than '000' or '001'. |
| ON_TO_OFF_PROB | 0 or 8 | ON state to OFF state transition probability (in %). The valid range for this field is '00000000' to '01100100'. This field is present only if the FRAME_ACTIVITY field has a value of '1'. |
| OFF_TO_ON_PROB | 0 or 8 | OFF state to ON state transition probability (in %). The valid range for this field is '00000000' to '01100100'. This field is present only if the FRAME_ACTIVITY field has a value of '1'. |
| SID_TYPE | 0 or 8 | This field is only present if the SID_TYPE_TO_USE field is set to a value '0001'. This field is set according to Table 9. |
| DATA_PATTERN | 0 or 8 | A byte pattern used to generate test data. This field is present only if the DATA_SOURCE field has a value of '0'. |
| MODE_CHANGE_FREQ | 0 or 8 | Frequency with which to change the AMR rates - set according to Table 10. This field is present only if the AMR_MODE_CHANGE field is set to '0001'. For all frequencies other than '0000', the AMR rate changes in a round-robin format through all the AMR rates enabled in the AMR_RATE field. |
| AMR_RATE | 0 or 8 | AMR rates to be used in the test. This is a bit mask of the eight possible AMR rates shown in Table 8. The bit field for each AMR rate is set to '1' if the rate is to be used, and set to '0' otherwise. This field is present only if the AMR_MODE_CHANGE field is set to '0001'. |

Table 6 lists the different types of control directives associated with the Test Service Control Message.

TABLE 6

| CONTROL_CODE | Definition |
| --- | --- |
| '00000000' | UE proposed control directive |
| '00000001' | SS control directive |
| '00000010' | SS control directive based on UE proposal |
| '00000011' | SS control directive based on UE proposal |
| '00000100' | SS control directive based on UE proposal (message cannot be handled by the current SS configuration) |
| '00000101' | SS control directive based on UE proposal (message structure not acceptable) |
| '00000110' | SS control directive based on UE proposal (unable to support a value of '10' for the FRAME_SOURCE field, i.e., cannot generate 1 data block each TTI) |
| '00000111'– '11111111' | Reserved |

Table 7 lists the various rates that may be configured for the downlink and uplink.

TABLE 7

Downlink/Uplink Data Rates

| Code | Test Configuration |
| --- | --- |
| '00000000' | Conversational/speech/12.2 kbps |
| '00000001' | Conversational/speech/7.95 kbps |
| '00000010' | Conversational/speech/7.4 kbps |
| '00000011' | Conversational/speech/6.7 kbps |
| '00000100' | Conversational/speech/5.9 kbps |
| '00000101' | Conversational/speech/5.15 kbps |
| '00000110' | Conversational/speech/4.75 kbps |
| '00000111'–'11111110' | Reserved |
| '11111111' | Custom Configuration |

Table 8 lists the eight possible AMR rates. Each AMR rate is associated with a respective bit in the bit mask, which is set to '1' if that AMR rate is to be used in the test.

TABLE 8

| DATA_RATE | AMR Full Rate |
| --- | --- |
| '00000001' | AMR 4.75 |
| '00000010' | AMR 5.15 |
| '00000100' | AMR 5.9 |
| '00000100' | AMR 6.7 (PDC-EFR) |
| '00001000' | AMR 7.4 (IS-641) |
| '00010000' | AMR 7.95 |
| '01000000' | AMR 10.2 |
| '10000000' | AMR 12.2 (GSM EFR) |

Table 9 lists the various types of SID frames that may be used for the testing.

TABLE 9

| SID_TYPE | AMR SID Type |
| --- | --- |
| '00000000' | AMR SID |
| '00000001' | EFR SID |
| '00000010' | IS-641 SID |
| '00000011' | PDC SID |
| '00000100'–'11111111' | Reserved |

Table 10 lists the frequency with which the AMR mode will change.

TABLE 10

| MODE_CHANGE_FREQ | Frequency (Seconds) |
| --- | --- |
| '00000000' | Never change |
| '00000001' | 2.56 |
| '00000010' | 5.12 |
| '00000011' | 20.48 |
| '00000100' | 40.96 |
| '00000101' | 81.92 |
| '00000110' | 163.84 |
| '00000111' | 327.68 |
| '00001000'–'11111110' | Reserved |
| '11111111' | Random number of 2.56 periods. |

Table 11 lists the fields of each TRANSPORT_CONFIG_DATA record. One record is included in the Test Service Control Message for each transport channel to be configured. The record includes various parameters that may be configured for the associated transport channel.

TABLE 11

TRANSPORT_CONFIG_DATA Record

| Field/ Parameter | Length (bits) | Definition |
| --- | --- | --- |
| TTI | 8 | Transmission time interval for the transport channel |
| RM | 8 | Rate matching attribute for the transport channel |
| TB_SIZE | 16 | Transport block size (in bytes) for the transport channel. This field is present only if the TRANSPORT_CONFIG field has a value of '1'. |
| NUM_TB | 8 | Number of transport blocks per TTI |
| CODING_TYPE | 4 | Coding to use for the transport channel |
| CRC_LEN | 4 | CRC to use for the transport channel |

Table 12 lists various channel configurations that may be used for testing.

TABLE 12

FLEX_TRANS_CONFIG

| FLEX_TRANS_CONFIG | Channel Configurations |
| --- | --- |
| '00' | Configuration as per TS 34.108 |
| '01' | Configuration as per TS 34.108 with specified TTI and RM attribute |
| '10'–'11' | Reserved |

Table 13 lists various options for changing AMR mode.

TABLE 13

AMR_MODE_CHANGE

| AMR_MODE_CHANGE | Mode change option |
| --- | --- |
| '0000' | No mode change |
| '0001' | AMR mode change as specified through MODE_CHANGE_FREQ and AMR_RATE fields. |
| '0010'–'1111' | Reserved |

Table 14 lists various SID types that may be used for testing.

TABLE 14

SID_TYPE_TO_USE

| SID_TYPE_TO_USE | SID Type |
| --- | --- |
| '0000' | Default SID corresponding to the selected AMR configuration in TS 34.108 |
| '0001' | As indicated in the SID_TYPE field. |
| '0010'–'1111' | Reserved |

Table 15 lists various TTIs that may be used for a transport channel.

TABLE 15

TTI Value

| TTI | Transport Channel TTI |
| --- | --- |
| '00000000' | 10 ms |
| '00000001' | 20 ms |
| '00000010' | 40 ms |
| '00000011' | 80 ms |
| '00000100'–'11111111' | Reserved |

Test Frame Transmission and Reception

The Markov test service performs uplink and downlink data processing for each TTI while the test service is connected. The transmit data block processing (by the SS for the downlink transport channels or the UE for the uplink transport channels) includes:

generate a data block for the CFN for which this block will be transmitted; and increment the counter corresponding to the test data type sent.

The receive data block processing (by the SS for uplink transport channels or the UE for downlink transport channels) includes:

generate a data block for the CFN for which this data block will be transmitted;

receive a data block and the test data type from the Radio Bearer;

if the test data type indicates pseudo-random data, then locally generate the data block, compare the contents of the generated data block with the contents of the received data block, and determine whether there are errors; and increment the correct counters according to the results of the above test and the test data type.

Various counters may be maintained by the SS and UE to support the W-Markov test service. For each link to be tested, a set of counters may be maintained at the transmitter to keep track of the number of data blocks (of various test data types) transmitted to the receiver. At the receiver, another set of counters may be maintained to keep track of the number of data blocks and data bits received from the transmitting source, the number of bit errors, frame errors, block errors, and so on. The counter values may thereafter be used to determine the bit error rate (BER), frame error rate (FER), and/or block error rate (BLER), and possibly other statistics such as the average transmission activity, average burst length, and so on. The downlink test results and statistical information may be reported by the UE to the SS via one or more messages.

As noted above, a number of transport channels may be concurrently tested for each of the downlink and uplink. Each transport channel may be independently configured. A set of counters may be maintained for each transport channel under test. For example, four sets of counters may be maintained for four transport channels used to send class A, B, and C bits and control data. Test results may then be obtained separately for each transport channel.

For clarity, the testing techniques have been specifically described for W-CDMA. However, these techniques may also be used for the other wireless communication systems and other CDMA systems.

The testing techniques described herein may be implemented by various means. For example, these techniques may be implemented in hardware, software, or a combination thereof. For a hardware implementation, the elements used to support the testing (e.g., the pseudo-random number generators, test data generators, controllers, and other processing units) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the testing techniques may be implemented with modules (e.g., procedures, functions, and so on) that perform the functions described herein. The software codes may be stored in a memory unit (e.g., memory units 242 and 272 in FIGS. 2A and 2 B) and executed by a processor (e.g., controllers 220 and 270). The memory units may be implemented within the processor or external to the processors, in which case it can be communicatively coupled to the processors via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of testing a communication link in a wireless communication system, comprising:

determining a current state of a Markov chain for a current transmission time interval (TTI), wherein the Markov chain models voice frames generated by an Adaptive Multi-Rate (AMR) speech encoder;

generating a data block of test data for the current TTI if the current state indicates that test data is to be transmitted; wherein the data block includes bits for a plurality of AMR classes; partitioning the data block into a plurality of frames for the plurality of AMR classes, and wherein each of the plurality of frames is transmitted on a respective transport channel; and processing the data block for transmission on at least one transport channel configured for the communication link.

2. The method of claim 1, further comprising:
determining a rate for the current TTI based on the current state, wherein the rate is either full rate or null rate, and wherein the data block is generated if the rate is full rate and not generated if the rate is null rate.

3. The method of claim 1, further comprising:
configuring the at least one transport channel during test setup.

4. The method of claim 1, further comprising:
selecting a transport format for each of the at least one transport channel, and wherein the processing for each of the at least one transport channel is determined by the transport format selected for the transport channel.

5. The method of claim 2, wherein a silence descriptor (SID) frame is transmitted for the null rate for each null rate interval of a predetermined duration.

6. The method of claim 5, further comprising:
selecting one SID type from among a plurality of SID types, and wherein the SID frame is of the selected SID type.

7. The method of claim 1, wherein a plurality of AMR modes are tested, and wherein each of the plurality of AMR modes is associated with a respective data rate.

8. The method of claim 7, further comprising:
selecting one AMR mode from among the plurality of AMR modes for the current TTI, wherein the data block has a size that is determined by the data rate associated with the selected AMR mode.

9. The method of claim 1, wherein the test data for the data block is a defined data pattern or pseudo-random data from a pseudo-random number generator.

10. The method of claim 1, further comprising:
selecting one TTI value from among a plurality of TTI values, wherein each of the plurality of TTI values is for a different time duration, and wherein the current TTI is of the selected TTI value.

11. The method of claim 1, wherein the communication link is either a downlink or an uplink.

12. The method of claim 1, further comprising:
selecting one Markov model from among a plurality of Markov models, and wherein the Markov chain is for the selected Markov model.

13. The method of claim 1, wherein the Markov chain comprises 16 states.

14. The method of claim 13, further comprising:
determining transitions among the 16 states based on transition probabilities that model voice activity.

15. The method of claim 1, wherein the Markov chain comprises two states.

16. The method of claim 15, wherein the two states of the Markov chain include an ON state and an OFF state, wherein the data block is generated if the current state of the Markov chain is the ON state and not generated if the current state is the OFF state.

17. The method of claim 16, further comprising:
obtaining a pseudo-random number from a pseudo-random number generator;
transitioning from the ON state to the OFF state based on the pseudo-random number and a first threshold value; and
transitioning from the OFF state to the ON state based on the pseudo-random number and a second threshold value.

18. The method of claim 17, further comprising:
configuring the first and second threshold values during test setup.

19. The method of claim 16, further comprising:
determining transitions between the ON state and the OFF state based on transition probabilities that model voice activity.

20. The method of claim 16, wherein test data transmission occurs on the at least one transport channel for an ON duration followed by no test data transmission for an OFF duration.

21. The method of claim 20, further comprising:
configuring the ON and OFF durations during test setup.

22. The method of claim 1, wherein downlink and uplink are concurrently tested based on a first set of at least one transport channel configured for the downlink and a second set of at least one transport channel configured for the uplink.

23. The method of claim 22, wherein rates for the downlink and uplink are configurable independently.

24. The method of claim 1, wherein the wireless communication system is a CDMA system.

* * * * *